United States Patent [19]

Barnes

[11] Patent Number: 4,604,986

[45] Date of Patent: Aug. 12, 1986

[54] BRIQUET STARTER AND OUTDOOR STOVE

[76] Inventor: Bruce L. Barnes, 2335 N. 31st, Springfield, Oreg. 97478

[21] Appl. No.: 670,570

[22] Filed: Nov. 13, 1984

[51] Int. Cl.⁴ .............................................. F24B 3/00
[52] U.S. Cl. ................... 126/25 B; 126/9 R; D23/90.1
[58] Field of Search .................. 126/9 R, 9 B, 25 B, 126/59.5; D23/90.1

[56] References Cited

U.S. PATENT DOCUMENTS

| | | | |
|---|---|---|---|
| 2,573,211 | 10/1951 | Manzler | 126/59.5 |
| 2,843,105 | 7/1958 | Badish | 126/9 B X |
| 3,453,975 | 7/1969 | Gunter | 126/25 B |
| 3,590,755 | 7/1971 | Niemann | 126/25 B X |
| 3,814,035 | 6/1974 | Miller | 126/25 B |
| 3,884,214 | 5/1975 | Duncan | 126/25 B |
| 3,903,866 | 9/1975 | Polinski | 126/25 B |
| 4,026,265 | 5/1977 | Spadaro | 126/25 B |
| 4,130,103 | 12/1978 | Zimmerman | 126/25 B |
| 4,227,510 | 10/1980 | Frazier et al. | 126/25 B |
| 4,417,565 | 11/1983 | Karpinia | 126/25 B |
| 4,531,507 | 7/1985 | Gerson | 126/25 B |

FOREIGN PATENT DOCUMENTS 2074309  10/1981  United Kingdom .............. 126/25 B

*Primary Examiner*—Margaret A. Focarino
*Attorney, Agent, or Firm*—James D. Jr. Givnan

[57] ABSTRACT

A briquet container having a heat shield extending along one side with the heat shield supporting an outwardly offset handle to protect same and a user's hand from radiant and conducted heat. The heat shield and container define an upright air passageway through which an airflow may pass. An adjustable grate regulates combustion air toward briquets thereon. A base includes legs which elevate the base and the container in place thereon away from a supporting surface. Base clips frictionally join the container and base to facilitate separation.

5 Claims, 4 Drawing Figures

U.S. Patent  Aug. 12, 1986  4,604,986
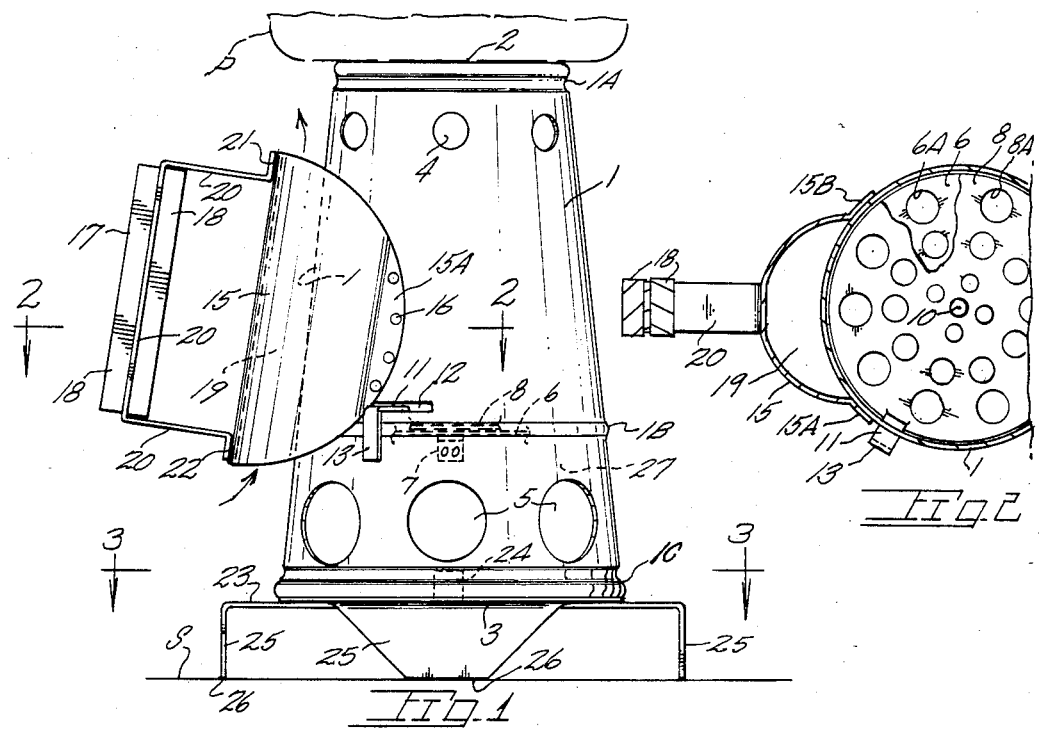
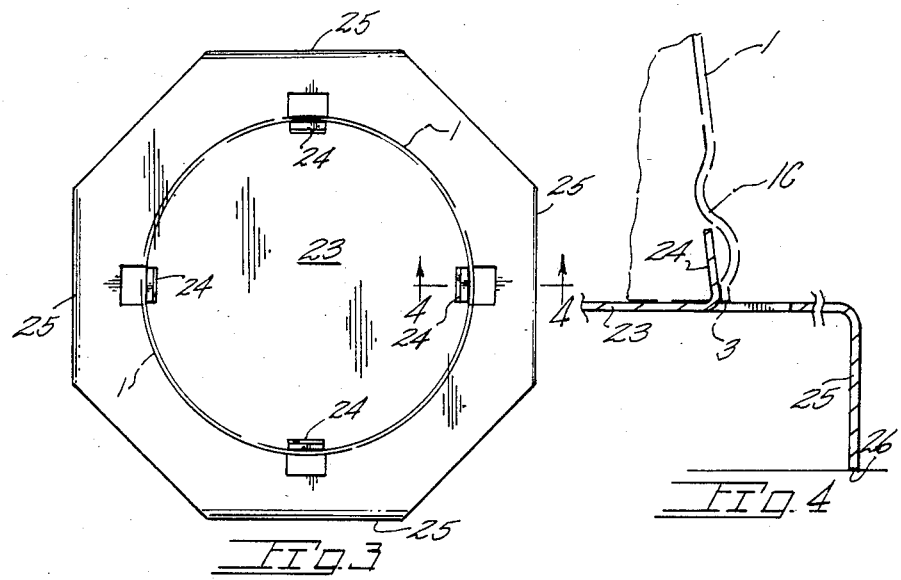

4,604,986

BRIQUET STARTER AND OUTDOOR STOVE

BACKGROUND OF THE INVENTION

The present invention concerns a device for rapidly igniting charcoal briquets.

The prior art discloses several devices intended for use in starting charcoal briquets which, by their nature, are slow to ignite. Within the art is the disclosure of such igniting devices having a secondary use as an outdoor stove such as to heat a camp site or duck blind. In such prior art stoves and heating devices due consideration has not always been given to providing a heat efficient article which does not subject the user or others to risk of injury or property damage. Of some interest are the following U.S. Pat. Nos.: 3,919,556, 4,026,265, 3,884,214, 4,417,565, 3,974,821 and 3,453,975.

SUMMARY OF THE PRESENT INVENTION

The present invention is embodied in a device which may serve both as a stove and for briquet lighting purposes without risk of injury or property damage.

The present article is of frusto-conical shape having a fuel supporting, adjustable grate. An attachable base includes legs to elevate same away from a supporting surface to avoid damage to same. A heat shield is interposed between the conical container of the device and a handgrip to prevent subjecting the user's hand to severe temperatures. The heat shield has an air passageway through which a convective airflow passes. The handle is mounted on the heat shield to avoid conduction of heat to the handle from the container wall.

Important objectives of the present stove article is the provision of a multi-use device in which briquets or other solid fuel may be burned in a safe, non-hazardous manner; the provision of a stove article having a stable base to isolate adjacent surfaces from high temperatures; the provision of a stove like article which protects the user's hand from high temperatures and isolates a handle from conducted heat.

BRIEF DESCRIPTION OF THE DRAWINGS

In the drawings:

FIG. 1 is an elevational view of the present charcoal lighter and stove;

FIG. 2 is a horizontal sectional view taken downwardly along line 2—2 of FIG. 1;

FIG. 3 is a plan view of the base of the present lighter and stove taken downwardly along line 3—3 of FIG. 1 with the container removed; and FIG. 4 is a vertical sectional view taken along line 4—4 of FIG. 3 with a container fragment in phantom lines.

DETAILED DESCRIPTION OF THE PREFERRED EMBODIMENT

With continuing reference to the drawing, the applied reference numeral 1 indicates a container in the shape of a frustum having a top rim or edge 2 and a bottom circular rim or edge at 3. Annular rolled areas at 1A, 1B and 1C serve to impart rigidity to the container. The container may be formed from a single sheet with a welded seam not shown.

Adjacent top edge 2 is a series of openings or vents 4 while a lowermost series of larger, air intake openings at 5 are adjacent bottom edge 3.

A stationary or fixed grate at 6 is supported by brackets as at 7 spot welded to the interior wall surface of the container 1. An adjustable, rotatable grate at 8 overlies the fixed grate and is pivotally secured thereto by a pivot 10. A grate handle at 11 extends upwardly from adjustable grate 8 and thence radially through a slot 12 in the container wall and terminates in a finger grip 13 offset from the container wall. Grate openings at 6A and 8A may be aligned or misaligned to open and close the grate with intermediate positions regulating an upward airflow.

A heat shield at 15 is a metal sheet of curved section as viewed in horizontal section in FIG. 2 with outwardly directed chordal shaped flanges at 15A-15B being spot welded as at 16 to the container exterior. The heat shield and the exterior of the container define an open area 19 open at its top and bottm through which a convective cooling flow of air may pass. A handle at 17 has non-metallic grips at 18 secured to a handle bracket 20 which terminates inwardly in securement to upper and lower end portions of the heat shield at 21 and 22 as by spot welding. The heat shield is of a length substantially equal to the length of handle 17 to fully isolate same and a user's hand thereon from radiant heat from the container.

A base at 23 serves to support the container 1, in an elevated manner, away from a supporting surface S to prevent heat damage to the latter. Clips at 24 formed on the base may flex inwardly to frictionally receive and engage the inner periphery of the container. The base upper surface, container 1, and the underside of lowermost grate 6 define a chamber 27 for the reception of briquet igniting material such as for example a crumpled newspaper page. Base legs at 25 may be formed by bending of the corners of a polygonal sheet metal plate with corner apices being removed to provide base bottom edges 26.

When used as a stove to heat the contents of a pan P the openings 4 serve as vents.

The container and base may be formed from 16 ga., cold rolled steel to provide a durable article.

While I have shown but one embodiment of the invention it will be apparent to those skilled in the art that the invention may be embodied still otherwise without departing from the spirit and scope of the invention.

Having thus described the invention, what is desired to be secured in Letters Patent is:

1. A briquet starter and outdoor stove comprising in combination, a container of frustum shape and including grate means and defining an upper and a lower series of air vent openings, a heat shield of curved section having upper and lower end portions and having a pair of flanges along its sides in place against the container exterior, means securing said flanges to said container, said heat shield of a length so as to extend along a major portion of the containers length, said curved heat shield defining an open area with the container and open at its upper and lower ends, to define an air passageway through which a convective air flow passes and a handle oppositely disposed on said heat shield from said container and including a bracket terminating at its ends in securement to said upper and lower end portions of the heat shield remote from the side flange so as to isolate the handle from heat radiated from the container, said handle substantially equal in length to heat shield length.

2. The briquet starter and outdoor stove claimed in claim 1 additionally including a base, flexible clips on said base for frictional engagement with the container to join the base and container in a detachable manner.

3. The briquet starter and outdoor stove claimed in claim 1 wherein said heat shield is of curved horizontal section and of a length substantially equal to the length of said handle to fully isolate a user's hand in place on the handle from heat radiated by the container.

4. The briquet starter and outdoor stove claimed in claim 1 wherein said heat shield is formed from a curved metal sheet, said flanges being of chordal shape.

5. The briquet starter and outdoor stove claimed in claim 2 wherein said base is formed from a metal sheet having corner portions bent downwardly to provide base legs.

* * * * *